United States Patent [19]

Kawakami

[11] Patent Number: 5,103,437
[45] Date of Patent: Apr. 7, 1992

[54] AUTOCHANGER TYPE DISC PLAYER

[75] Inventor: Hiroshi Kawakami, Kanagawa, Japan

[73] Assignee: Kabushiki Kaisha Toshiba, Kanagawa, Japan

[21] Appl. No.: 241,293

[22] Filed: Sep. 7, 1988

[30] Foreign Application Priority Data

Sep. 7, 1987 [JP] Japan .................... 62-223319

[51] Int. Cl.⁵ .................................... G11B 17/22
[52] U.S. Cl. .................................... 369/36
[58] Field of Search ............ 369/34, 36, 37, 38, 369/39; 360/98.01, 98.04, 99.02, 99.06

[56] References Cited

U.S. PATENT DOCUMENTS

| | | | |
|---|---|---|---|
| 4,278,258 | 7/1981 | Fujita et al. | 369/291 X |
| 4,599,716 | 7/1986 | Shimbo | 369/39 X |
| 4,601,026 | 7/1986 | Kawakami | 369/38 |
| 4,695,990 | 9/1987 | Kawakami | 369/38 |
| 4,701,900 | 10/1987 | Hasegawa et al. | 369/39 X |
| 4,730,291 | 3/1988 | Ikedo et al. | 369/39 X |
| 4,730,292 | 3/1988 | Hasegawa et al. | 369/36 |
| 4,737,995 | 4/1988 | Yamazaki et al. | 369/36 |

Primary Examiner—William M. Shoop, Jr.
Assistant Examiner—David Martin
Attorney, Agent, or Firm—Finnegan, Henderson, Farabow, Garrett, and Dunner

[57] ABSTRACT

An autochanger type disc player characterized by the fact that it is equipped with trays that contain discs, a cartridge capable of containing plural number of trays, a vertical tray transfer member that is moved to a position corresponding to a desired tray contained in the cartridge, a tray horizontal tray transferring mechanism that turns over the tray between the vertical tray transfer member and the cartridge, and a carrier mechanism that carries the vertical tray transfer member from a position corresponding to the desired tray a disc playback position, and that the carrier mechanism is equipped with a rotating body that has plural number of cams formed corresponding to moving paths of the vertical tray transfer member from respective positions corresponding to the trays contained in the cartridge to the disc playback position, and when the vertical tray transfer member is at a position corresponding to a desired tray in the cartridge, the cam of the rotating body corresponding to the moving path between the vertical tray transfer member position and the disc playback position is selected and the vertical tray transfer member is carried by this cam.

3 Claims, 17 Drawing Sheets

AUTOCHANGER TYPE DISC PLAYER

FIELD OF THE INVENTION

The present invention relates generally to an autochanger type disc player, and more particularly, to a disc automatically changing mechanism suitable for a compact disc players.

BACKGROUND OF THE INVENTION

Recently, in the field of audio equipment, digital audio disc playback systems utilizing pulse code modulation (referred as PCM hereinafter) technology to playback sound as faithfully as possible have been developed. Of these systems, playback systems employing digital audio discs, so-called as compact discs (compact disc will be referred as CD hereinafter), have become especially popular.

Specifically, the CD used in the digital audio disc playback system is typically formed in the type of record disc which is made from a transparent resin and has a diameter of 12 cm and a thickness of 1.2 mm. The CD has a thin metal film deposited on at least one surface thereof, and pits or recesses are formed in the thin metal film, corresponding to digitized data (PCM data) so that logic 1 and 0 may produce different light reflectivities. The PCM data are read out from the CD, when the CD is rotated at a variable rotation frequency of 200 to 500 rpm with a constant linear velocity. The PCM data of the CD are read by an optical pickup incorporating a semiconductor laser or photoelectric transducer device which traces the record track of the CD and moves rectilinearly from the inner side toward the outer side of the CD during the tracing.

The CD stores a large quantity of information that it permits a stereophonic playback for about one hour even if only one side of the CD is used for information storage.

It has been theoretically proved that the CD is much superior to the conventional analog phonograph record in both playback characteristics and information storage density.

In view of the excellent characteristics of the CD, it has been suggested to use CDs in an automatic multi-CD playback system for personal and/or business use. It is possible to realize the automatic multi-CD playback system by means of an autochanger type CD player. An autochanger mechanism in the CD player automatically selects a desired CD in a cartridge accomodated in the CD player and carries the selected CD to the playback position. When the playback of the selected CD is finished, the autochanger type CD player returns the CD from the playback position to the original position in the cartridge if the autochanger mechanism is installed to the main unit of the CD player in advance with plural number of CDs contained.

Conventional autochanger type CD players of this kind are complex in structure and bulky, however, partially because they have been designed for use with analog phonograph records.

Therefore, the conventional autochanger type CD players present control problems. Further, the requirement of more certain operation limits the number of CDs held within such a CD player. Another problem is the long time it takes to exchange one CD for another.

For these reasons, if the conventional autochanger type CD player is applied to CDs without changing the essential structure of the CD player, there arise numerous problems. Hence, the development of an autochanger type CD player suitable for CDs is a matter of urgency.

In these autochanger type CD players, the autochanger mechanism carries out some complicated processes as follows. First, the autochanger mechanism pulls out a desired CD from a cartridge which houses a number of CDs therein. The CDs are stored in the cartridge by being raised on exclusive carrying trays, respectively. That is, the autochanger mechanism pulls out a tray supporting a desired CD. Then, the autochanger mechanism carries the CD together with the corresponding tray to a playback position. For example, the autochanger mechanism lowers the CD on a turntable of a playback section. When the playback of the CD has finished, the autochanger mechanism lifts up the CD from the turntable to a prescribed height position. And then, the autochanger mechanism returns the CD into the storing position in the cartridge where the CD was originally housed.

As described above, complicated motions are needed for the automatic CD change. In connection with this, the autochanger mechanism requires a large number of parts. Furthermore, there will be such a problem that the size thereof may become large in scale so that the size of the entire CD player is enlarged.

The same circumstances apply to video CD players and optical CD document file systems which are soon to be put into practical use.

SUMMARY OF THE INVENTION

In view of the foregoing, it is an object of the present invention to provide an autochanger type disc player equipped with an autochanger mechanism which is simple in structure and effective for miniaturizing the entire size of the player.

Another object of the present invention is to provide an autochanger type disc player which is simple in construction.

Still another object of the present invention is to provide an autochanger type disc player which is capable of selecting with certainty a predetermined CD among many CDs stored close each other in a CD storage section.

According to one aspect of the present invention, the autochanger type CD player includes a cartridge capable of housing multiple CDs, a number of trays for exclusively holding the CD in the cartridge, a vertical tray transfer member which is movable between a position corresponding to a desired tray in the cartridge and a playback position, a CD search mechanism for accessing a desired CD in the cartridge, a mechanism for taking/returning a tray holding a desired CD from/to the cartridge, a tray transferring mechanism for carrying the tray to/from a CD playback position, and a rotary cam which has a plurality of cams formed corresponding to the moving routes of the vertical tray transfer member from respective positions corresponding to the trays contained in the cartridge of the above-mentioned CD playback position and is so designed that when the vertical tray transfer member is at the position corresponding to a desired tray of the cartridge, the cam of the above-mentioned rotating body corresponding to the moving path from the vertical tray transfer member's position to the CD playback position is selected and the vertical tray transfer member is carried by the guide of this cam.

According to the above-mentioned means, when the vertical tray transfer member is moved between each tray position (the position from where the vertical tray transfer member is moved for searching a CD) and the CD playback position (the turntable), the rotating body of the carrier mechanism selects the cam corresponding to the moving path of the vertical tray transfer member. Therefore, when the rotating body is turned in the forward direction, the vertical tray transfer member is moved to the CD playback position by the selected cam. On the other hand, when the rotating body is turned in the reverse direction, the vertical tray transfer member is returned to the original position. This action is realized for each of the trays by the rotational driving motion of a single rotating body.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

An embodiment of the autochanger type CD player according to the present invention will be described in detail with reference to the FIGS. 1 through 17.

Figure 1:
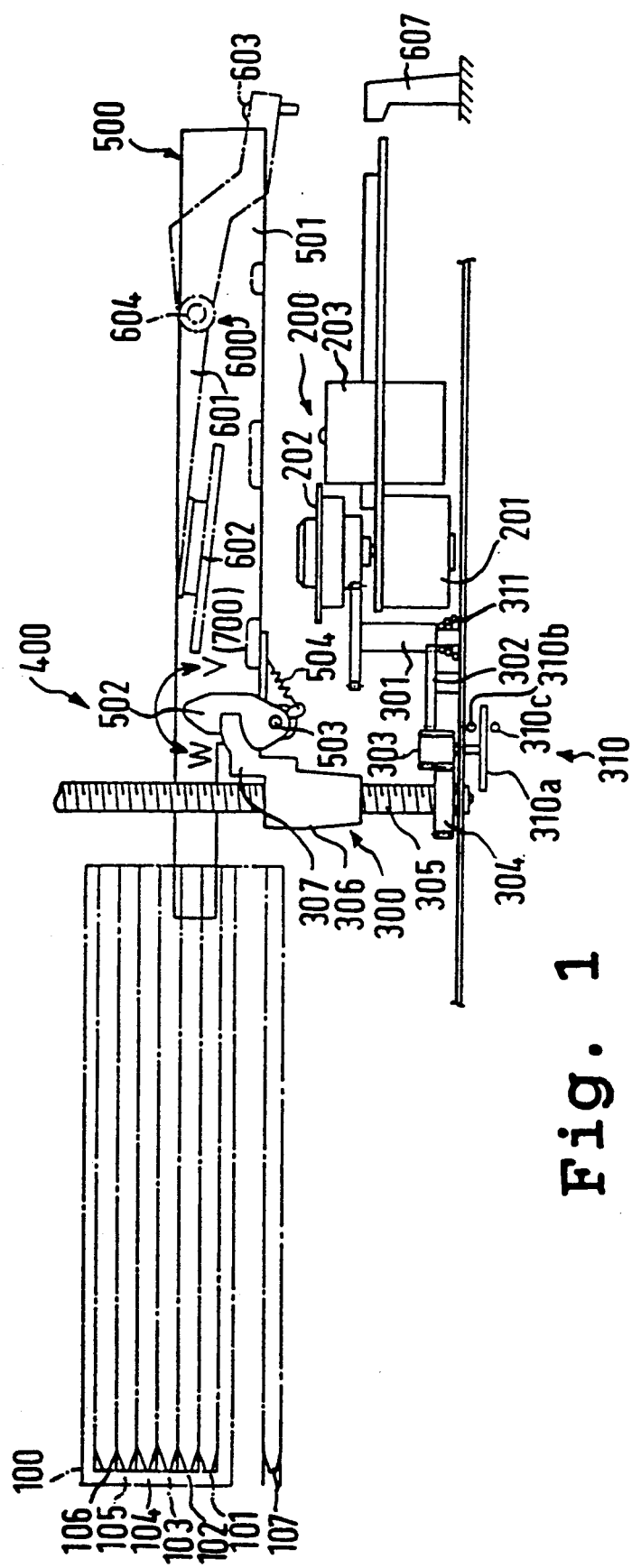
FIG. 1 is a side elevation showing an embodiment of the autochanger type disc player according to the present invention.

As shown in FIG. 1, the autochanger type CD player comprises a cartridge 100, a playback section 200, a search mechanism 300 and a transferring mechanism 400. The cartridge 100 contains a plurality of trays, e.g., six pieces of trays 101 to 106 for removably housing six pieces of CDs in the cartridge 100. The playback section 200 comprises a turntable drive motor 201, a turntable 202 and a pickup 203. The search mechanism 300 is provided for the search of a desired CD for reproduction selected from the CDs stored in the cartridge 100. The transferring mechanism 400 transfers the selected CD between the cartridge 100 and the playback section 200. The transferring mechanism 400 comprises a vertical transferring section 500, a clamp mechanism 600 and a horizontal transferring section 700. Each of the components, i.e., the cartridge 100, the playback section 200, the search mechanism 300, the transferring mechanism 400, the vertical transferring section 500, a clamp mechanism 600 and a horizontal transferring section 700 will be described in detail later.

The CDs are removably housed in the cartridge 100 by being held on the trays 101 to 106, as described above. The trays 101 to 106 are stacked in the cartridge 100 in the vertical direction and each exclusively holds a piece of the CDs. The cartridge 100 is defined a rectangular opening through which the trays 101 to 106 can be put in or pulled out as they holding the CDs thereon. The cartridge 100 is removably mounted to a specified space of the player. An extra tray 107 other than the trays 101 to 106 in the cartridge 100 is provided in the apparatus below the cartridge 100. The extra tray 107 can allow a temporal reproduction for additional CD other than the CDs stored in the cartridge 100.

Figure 2:
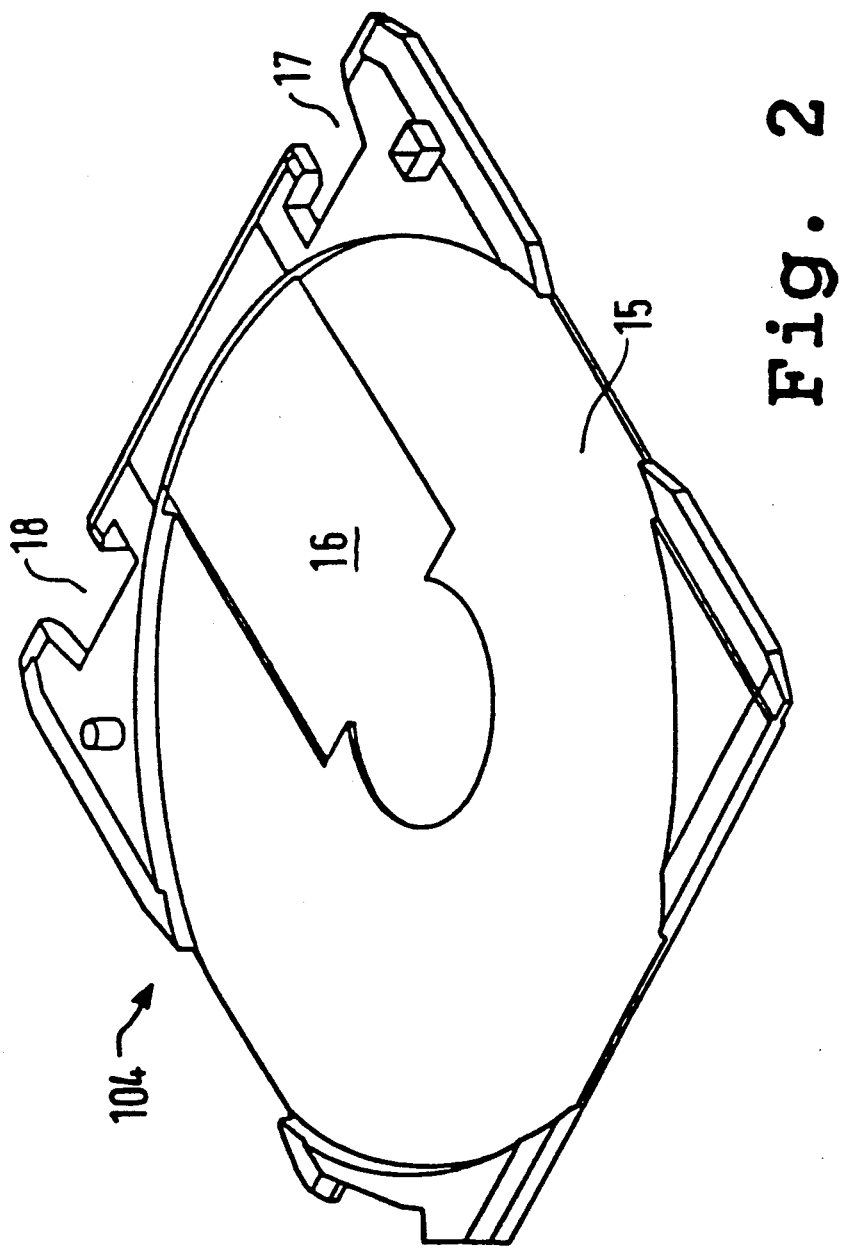
FIG. 2 is a perspective view showing a typical example of the tray stored in the cartridge shown in FIG. 1.

FIG. 2 shows a typical example of the trays 101 to 106, e.g., the tray 104. As shown in FIG. 2, the tray 104 has a rectangular thin plate shape. A round recess 15 is formed at the center to the tray 104. The round recess 15 defines a space fit to the CD for holding the CD on the tray 104. Furthermore, an opening 16 is formed in the round recess 15. The opening 16 extends from the center to the one end of the round recess 16 so that the pickup 203 (see FIG. 1) is able to face with the CD for reproducing PCM data recorded on the CD through the opening 16. In addition, a pair of L-shaped notches 17 and 18 are defined near both sides of the front end of the tray 104. At least one of the L-shaped notches 17 and 18 can be engaged with the transferring mechanism 400, when a prescribed CD held on the tray 104 is accessed for reproduction by the search mechanism 300, as described later. The transferring mechanism 300 pulls out the tray 104 from the cartridge 100 or puts the tray 104 into the cartridge 100. A selected CD held on the tray 104 is taken out from the cartridge 100 or returned into the cartridge 100.

In a CD loading operation, the transferring mechanism 400 pulls out the tray 104 holding the selected CD and then transfers the tray 104 on a tray support member 501 of the vertical transferring section 500. In a CD unloading operation, the transferring mechanism 400 puts the tray 104 from the tray support member 501 of the transferring mechanism 400 into a prescribed portion of the cartridge 100. The vertical transferring section 500 constitutes the transferring mechanism 400 together with the horizontal transferring section 700, as described before.

Prior the loading operation, the search mechanism 300 vertically moves the transferring mechanism 400 for accessing a desired CD stored in the cartridge 100 of the CD held on the extra tray 107 for reproduction. So that the tray support member 401 is controlled to face a selected tray holding the desired CD, e.g., the tray 104 in the cartridge 100.

As shown, the search mechanism 300 comprises a clutch gear 301, a pair of idler gears 302, 303, a search drive gear 304 and a screw rod 305. The clutch gear 301 is selectively driven by a turntable motor 201 through a gear engagement between the clutch gear 301 and a turntable 202 coupled to the turntable motor 201. The rotation of the turntable motor 201 is transmitted to the search drive gear 304 through the clutch gear 301 and the idler gears 302, 303. Thus, the search drive gear 304 rotates the screw rod 305. A travelling nut 306 meshed on the screw rod 305 is allowed to move in the vertical direction along the screw rod 305, i.e., in the direction shown by arrows +Y or −Y in the drawing. The travelling nut 306 is regulated its rotation by a rotation regulator (not shown).

A vertical position of the travelling nut 306 is defined by a tray position indicator 310. The tray position indicator 310 comprises a rotary disc plate 310a coaxially mounted to the idler gear 303, a light source 310b provided above the rotary disc plate 310a and a photosensor 310c provided under the rotary disc plate 310a in corresponding to the light source 310b. The rotary disc plate 310a has a prescribed number of slits or openings (not shown) each capable of crossing the light from the light source 310b to the photosensor 310c in the rotation of the rotaly disc plate 310a. Thus, the position of the travelling nut 306 is indicated by counting output pulses from the photosensor 310c for the search of the selected tray 104 holding the desired CD.

Figure 3:
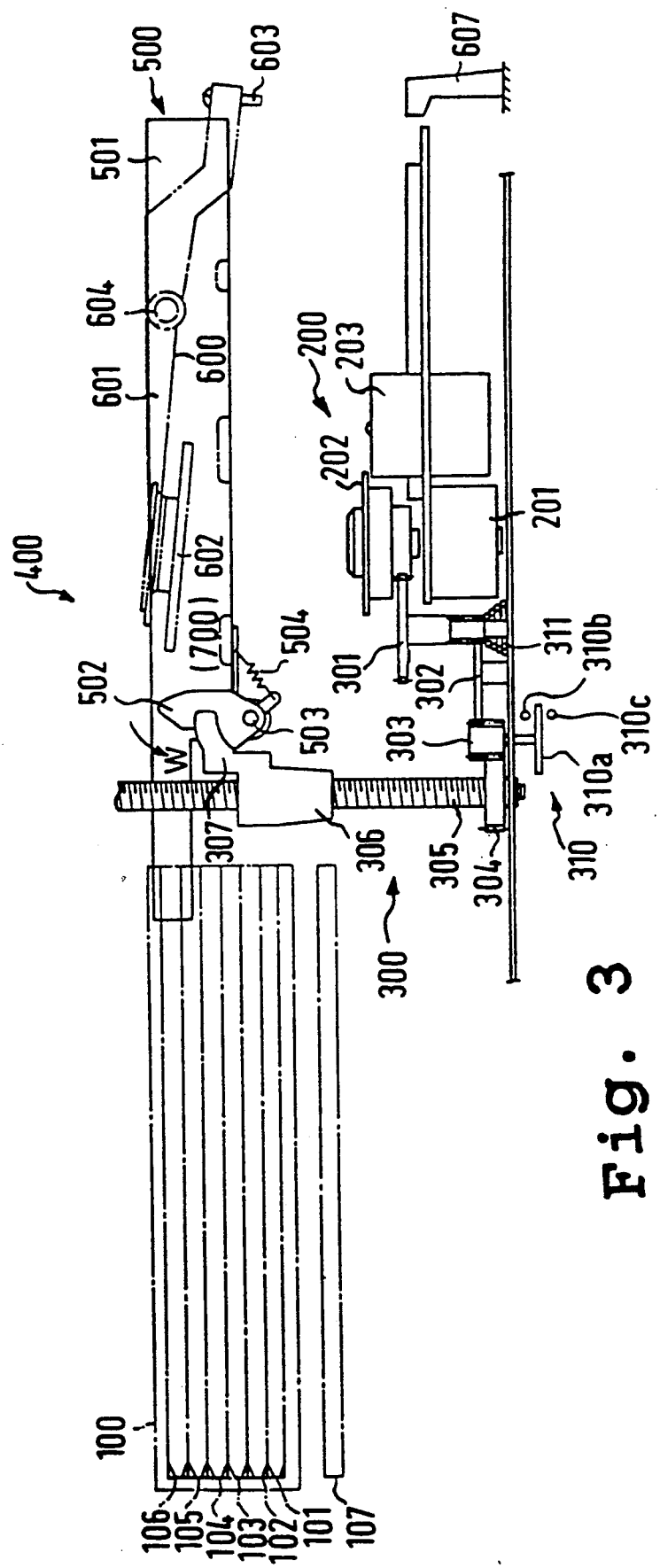
FIGS. 3, 4 and 5 are side elevations explaining the operation of the search mechanism of FIG. 1.

The travelling nut 306 has an engaging arm 307. The engaging arm 307 is provided for a selective engagement with a lock lever 502. The lock lever 502 is mounted on the tray support member 501 of the vertical transferring section 500 by a support pin 503. The lock lever 502 is biased by a spring 504 in the unti-clockwise direction, as shown by an arrow W, in the drawing. Thus, the lock lever 502 is normally kept engaged with the engaging arm 307 of the travelling nut 306. The vertical transferring section 500 moves upward or downward in accompany with the travelling nut 306 through the engagement between the engaging arm 307 and the lock lever 502 when the travelling nut 306 moves upward or downward in the search operation. Thus, the transferring mechanism 400 faces with a selected tray, e.g., the tray 104 holding a desired CD according to the search operation of the travelling nut 306 of the search mechanism 300. When the tray position indicator 310 counts a prescribed number of pulses corresponding to the position of the tray 104 holding the desired CD, the turntable motor 201 is deactivated. Thus, the search operation of the search mechanism 300 for the desired CD is completed. FIG. 3 shows the state that the vertical transferring section 500 of the transferring mechanism 400 is located at the position corresponding to the selected tray 104.

Figure 4:
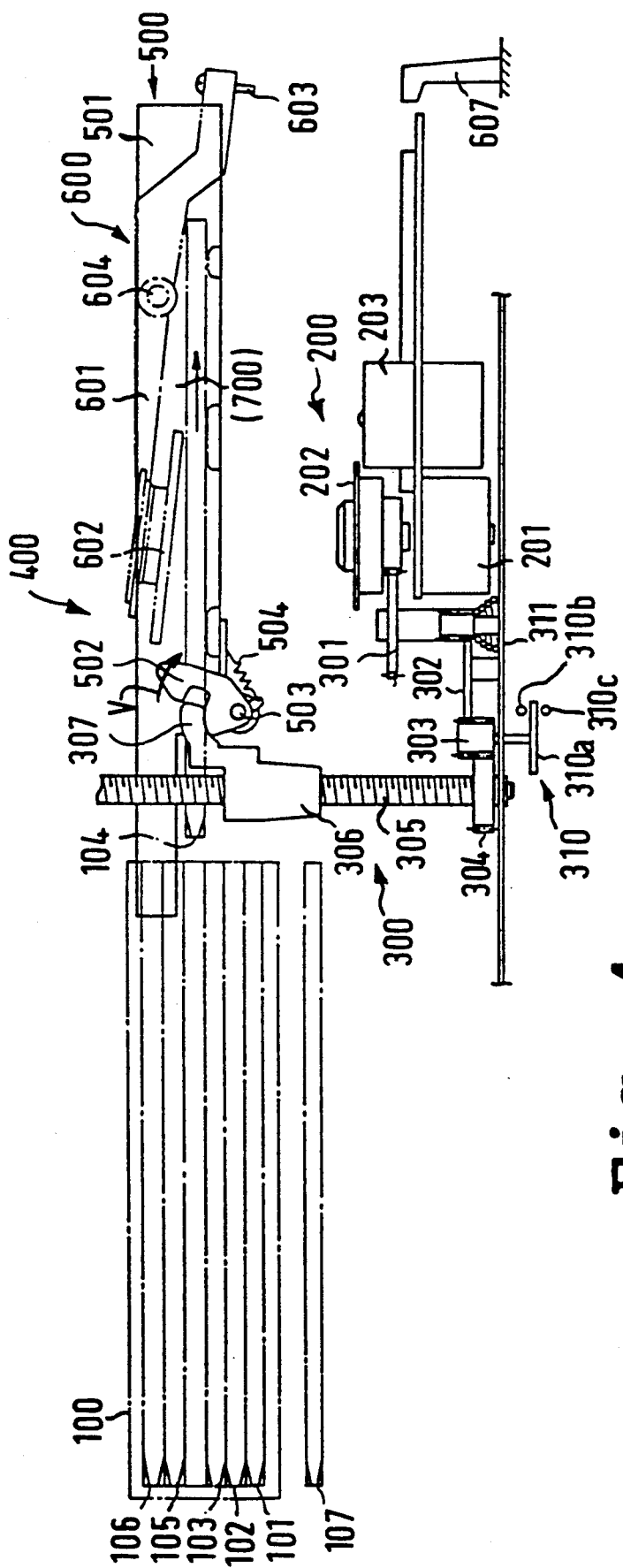

After the search operation, the selected tray 104 is horizontally moved from the cartridge 100 to the vertical transferring section 500 by a horizontal transferring section of the transferring mechanism 400, as shown in FIG. 4. The horizontal transferring section will be described in detail later. When the tray 104 is moved on the vertical transferring section 500, the lock lever 502 is turned in the clockwise direction, as shown by the arrow V, in the drawing against the spring 504. The lock lever 502 is driven by a lock releasing mechanism, as described later (see FIGS. 11, and 13). As a result, the engagement between the lock lever 502 and the engaging arm 307 of the travelling nut 306 is released.

Figure 5:
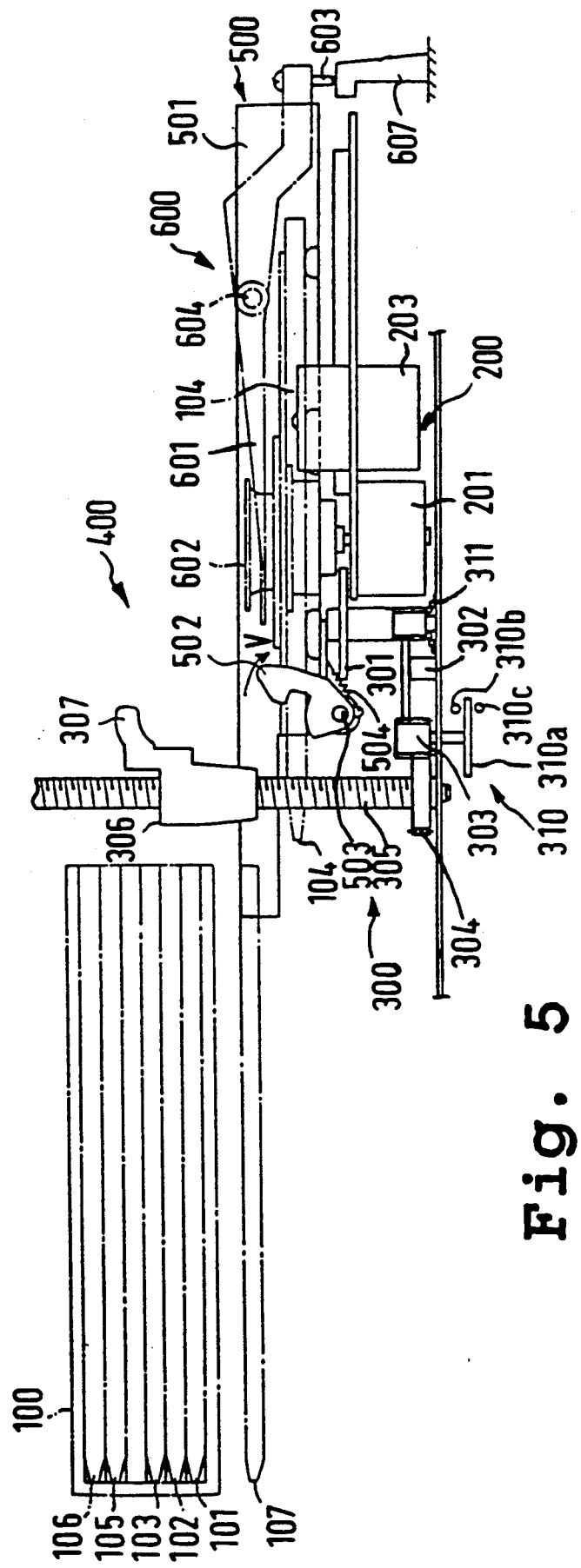

The vertical transferring mechanism 500 moves toward the playback section 200, when the transferring mechanism 400 is released from the search mechanism 300. FIG. 5 shows the state that the vertical transferring section 500 is located at the playback section 200. The vertical movement of the transferring mechanism 400 other than the movement at the search operation is carried out by a vertical transfer drive mechanism, as described later.

The travelling nut 306 is kept in the vertical position, after the vertical transferring section 500 is moved downward for the reproduction of the CD. Therefore, the travelling nut 306 has a mechanical memory for the vertical position where the selected tray 104 was removed from the cartridge 100.

When the vertical transferring mechanism 500 reaches the playback position 200, a part of the vertical transferring mechanism 500 presses the clutch gear 301 downward, as shown in FIG. 5. Thus, the clutch gear 301 is released from the turntable 201. The turntable motor 201 drives only the turntable 202, when it is activated for the reproduction of the CD. The clutch gear 301 is biased upward by a coil spring 311 so that the clutch gear 301 is normally engaged with the turntable motor 201. However, the vertical transferring mechanism 500 pushes the clutch gear 302 downward against the coil spring 311, so that the turntable motor 201 becomes free from the search mechanism 300 during the reproduction of the CD.

The vertical transferring section 500 of the transferring mechanism 400 is provided with the clamp mechanism 600, as described before. The clamp mechanism 600 comprises a clamp lever 601, a clamper 602 and an adjustable pin 603, as shown in FIG. 1. The clamp lever 601 is rockably mounted on the vertical transferring section 500 by a support pin 604. The clamp lever 601 is biased in the clockwise direction by a spring (not shown). The clamper 602 is rotatably mounted to one end of the clamp lever 601. The adjustable pin 603 is mounted to the other end of the clamp lever 601. The adjustable pin 603 has a screw engagement with the other end of the clamp lever 601.

When the vertical transferring mechanism 500 moves downward, the adjustable pin 602 engages with a projection 605 protruding from a chassis (not shown) of the apparatus. Thus, the clamp lever 601 is rocked in the clockwise direction around the support pin 604, as shown in FIG. 5, when the vertical transferring mechanism 500 reaches the playback section 200. The clamper 602 on the one end of the clamp lever 601 presses the CD against the turntable 202. The CD is stably supported on the turntable 202 by the clamp mechanism 600. The clamper 602 is rotatably mounted to the clamp lever 601, as described above. So that, the CD is driven by the turntable motor 201 during the reproduction of the CD. The adjustable pin 603 adjusts the clamping pressure of the clamper 602 against the CD. A pickup 203 provided in the playback section 200 moves along the radius of the CD supported on the turntable 202 for reproduction of the CD.

The vertical transferring section 500 moves upward, when the reproduction of the CD finishes. The vertical transferring section 500 again engages with the search mechanism 300, as shown in FIG. 4, when the vertical transferring section 500 reaches the vertical position where the selected tray 104 was pulled out from the cartridge 100. The lock lever 502 turns in the unticlockwise direction according to the spring 504 so that the lock lever 502 engages with the engaging arm 307 of the travelling nut 306. The tray 104 is then returned into the prescribed position in the cartridge 100, where the tray 104 was stored before.

Referring now to FIGS. 6 through 12, the horizontal transferring section 700 of the transferring mechanism 400 will be described. The horizontal transferring section 700 is provided for transferring a prescribed tray, e.g., the tray 104 in the cartridge 100 or the extra tray 107 between the vertical transferring section 500 and the cartridge 100 or the space for the extra tray 107.

Figure 6:
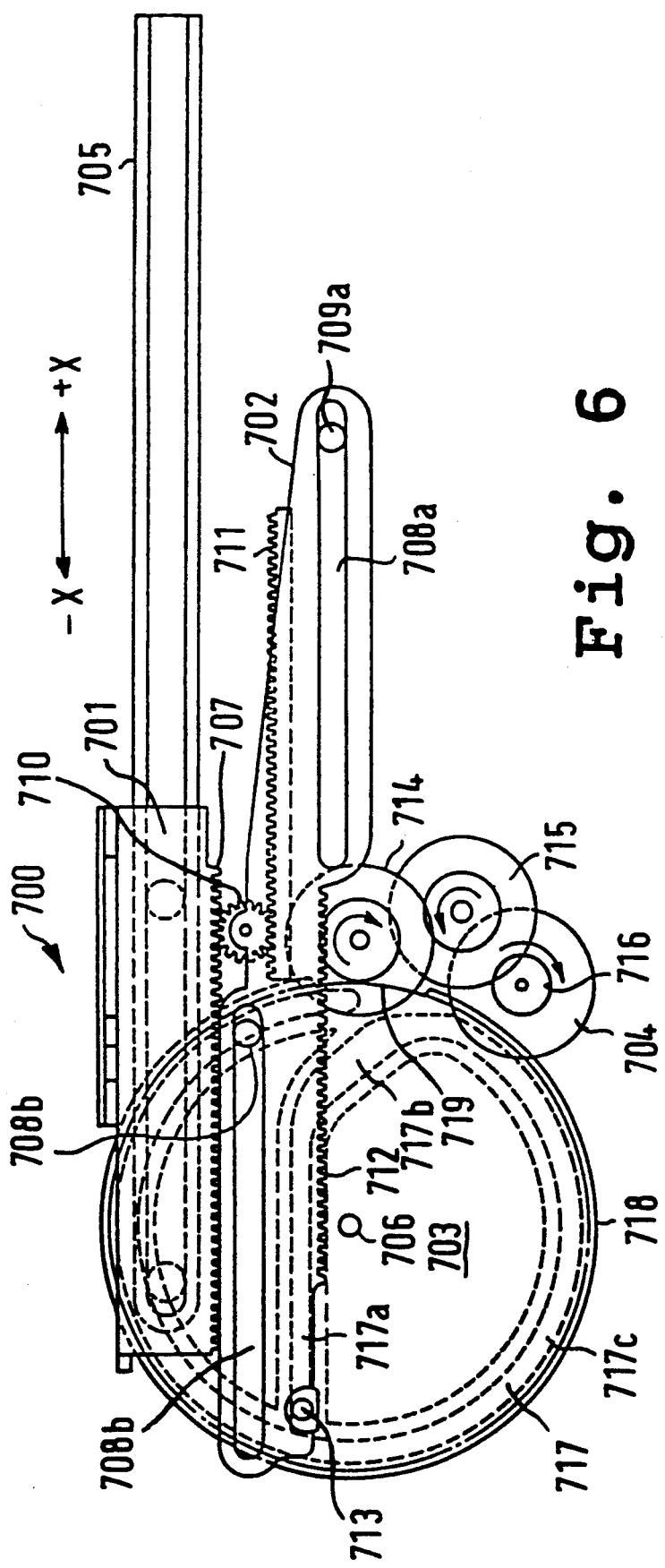
FIG. 6 is a side elevation showing the horizontal transferring section of FIG. 1.

As shown in FIG. 6, the horizontal transferring section 700 comprises a first slider 701, a second slider 702, a rotary cam 703 and a transfer drive motor 704. The first slider 701 is slidably supported by a guide rail 705. The second slider 702 is provided in parallel with the first slider 701. The rotary cam 703 is rotatably mounted on the chassis of the apparatus by a support pin 706. The guide rail 705 is fixed to the chassis of the apparatus along the horizontal direction, as shown by the arrows +x and −x in the drawing. The first slider 701 is thus movable in the horizontal direction. The first slider 701 has a first rack portion 707. The second slider 702 has a pair of guide slits 708a and 708b extending in the horizontal direction. The guide slits 708a and 708b fit to a pair of guide pins 709a and 709b provided on the chassis of the apparatus, respectively. Thus, the second slider 702 is slidable in the horizontal direction. The second slider 702 has a pinion 710 rotatably mounted in the middle of the second slider 702. The pinion 710 engages with both the first rack portion 707 of the first slider 701 and a rack member 711 fixed on the chassis of the apparatus. The rack member 711 is also extending in the horizontal direction.

Further, the second slider 702 has a second rack portion 712 and a cam pin 713. The second rack portion 712 engages with a slider drive gear 714. The slider drive gear 714 is coupled to the transfer drive motor 704 through an idler gear 715 and a motor gear 716. The cam pin 713 engages with a vertical transfer trigger cam groove 717 of the rotary cam 703. The motor gear 716 is mounted to the drive shaft of the motor 703.

The slider drive gear 714 is driven by the transfer drive motor 704 through the motor gear 716 and the idler gear 715, when the transfer drive motor 704 is activated. The transfer drive motor 704 starts the operation at the time that the search operation of the search mechanism 300 for a prescribed tray, e.g., the tray 104 holding a desired CD is completed. Such a control for the motors 704, 201 and the like is carried out by a conventional manner using a microcomputer.

The slider drive gear 714 rotates in the clockwise direction, when the transfer drive motor 704 is activated. The slider drive gear 714 drives the second slider 702 rightward in the drawing, i.e., in the direction of the arrow +x, through the gear engagement between the slider drive gear 714 and the second rack portion 712. The pinion 710 mounted on the second slider 702 rotates in meshing with the fixed rack member 711. The pinion 710 engages with the first rack portion 707 of the first slider 701. Thus, the first driver 701 is driven in the direction of the arrow +x. Gear ratios among the pinion 710, the rack member 711 and the first rack portion 707 are set so that, for instance, the first slider 701 moves the distance two times that of the second slider 702.

Prior the movement of the second slider 702, the rotary cam 703 is maintained in a state where the first straight portion 717a of the vertical transfer trigger cam groove 717 has the horizontal position, as shown in FIG. 6. The cam pin 713 of the second slider 702 is positioned in the leftward end of the straight portion 717a. Thus, the cam pin 713 moves rightward along the straight portion 717a without rotating the rotary cam 703, at first the movement of the second slider 702.

Figure 7:
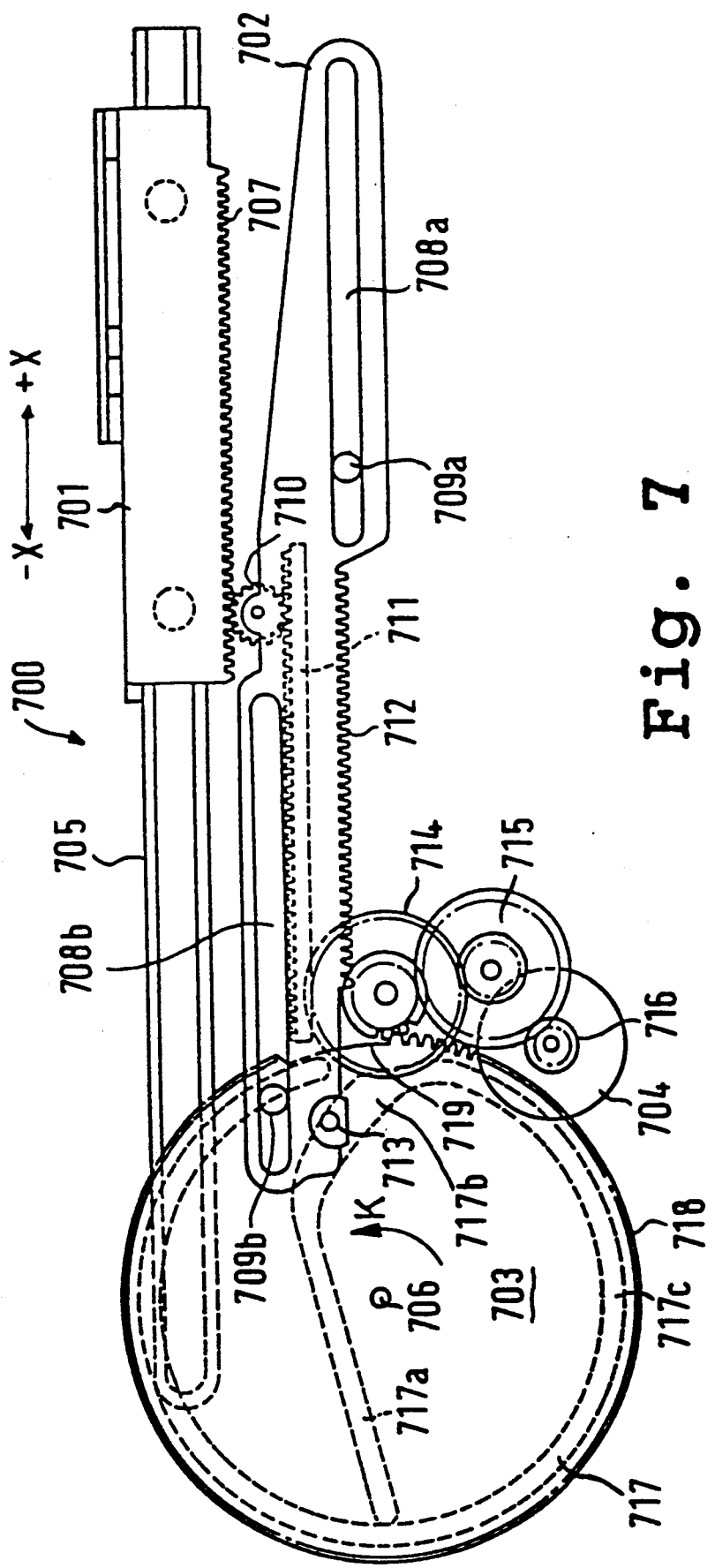
FIGS. 7 and 8 are side elevations explaining the operation of the horizontal transferring section of FIG. 6.

The cam pin 713 engages with the second straight portion 717b of the vertical transfer trigger cam groove 717, when the second slider 702 moves rightward for a prescribed distance, as shown in FIG. 7. In the position, the second rack portion 712 is disengaged from the slider drive gear 714. While, the cam pin 713 drives the rotary cam 703 to rotate in the unti-clockwise direction. The rotary cam 703 is formed a gear section 718 on the periphery of the cam 703. The gear section 718 is defined a notch 719. The notch 719 of the gear section 718 faces with the slider drive gear 714 prior the operation of the second slider 702, as shown in FIG. 6.

Figure 8:
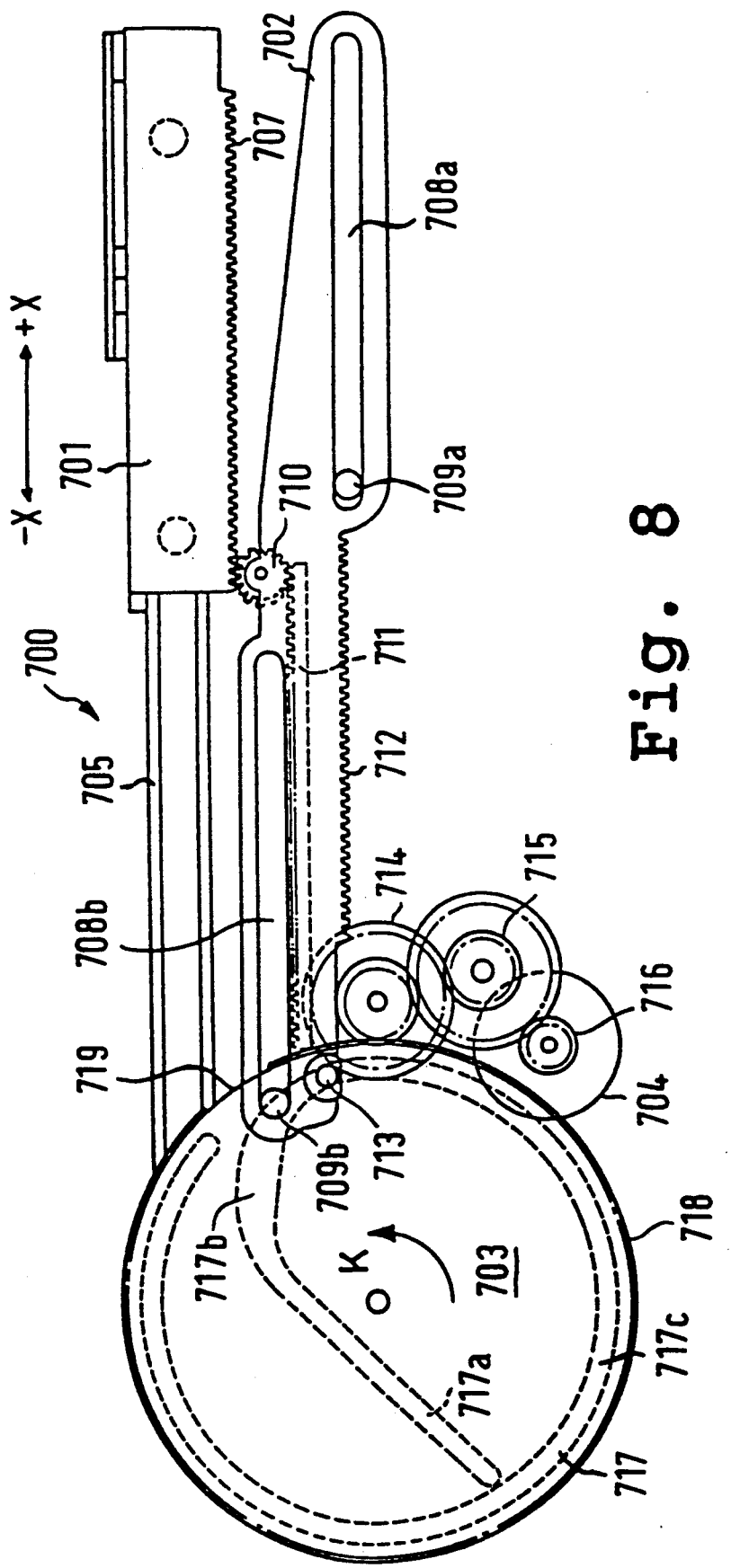

According to the unti-clockwise rotation of the rotary cam 703, the gear section 718 comes into the engagement with the slider drive gear 714. Thus, the rotary cam 703 is driven by the transfer motor 704. The rotary cam 703 in the rotation drives the cam pin 713 to move rightward. Then the second and first sliders 702 and 701 are driven to the rightward positions, as shown in FIG. 8. After the first and second sliders 701 and 702 have reached to the positions, the cam pin 713 can follow the round section 717c of the vertical transfer trigger cam groove 717. The rotary cam 703 in the rotation drives the vertical transferring section 500, as described in detail later.

During the rotation of the rotary cam 703, the first and second sliders 701 and 702 are maintained in the rightward positions, as shown in FIG. 8. Thus, the cam pin 713 can follow the round section 717c of the vertical transfer trigger cam groove 717.

The horizontal transferring section 700 of the transferring mechanism 400 further comprises a tray carrier 800. The tray carrier 800 is provided for pulling out a prescribed tray, e.g., the tray 104 holding the CD to be transferred to the playback section 200. The tray carrier 800 will now be described in detail in reference to FIGS. 9, 10 and 11.

Figure 9:
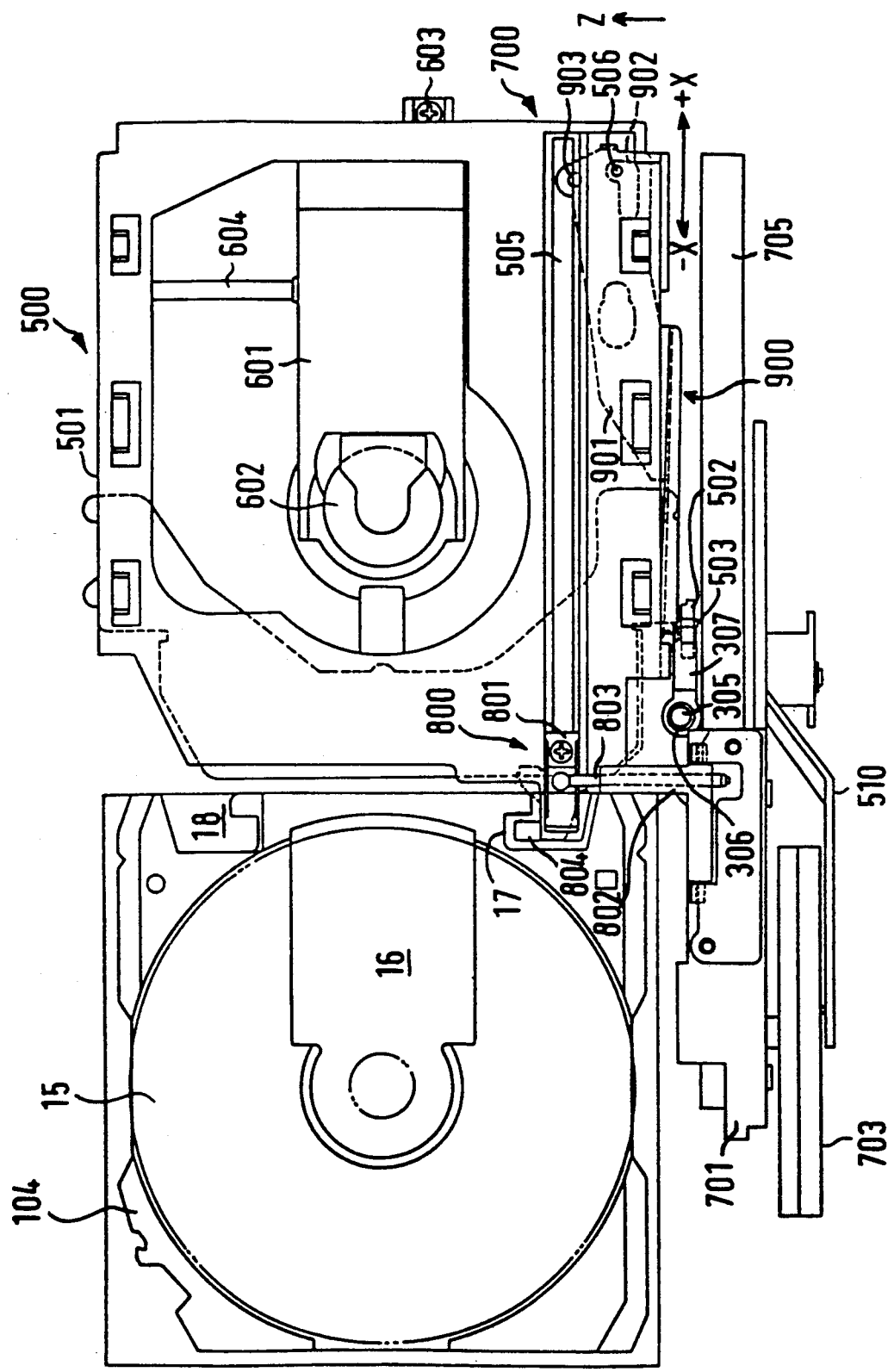
FIGS. 9 and 10 are flat views showing the horizontal transferring section of FIG. 1.
Figure 10:
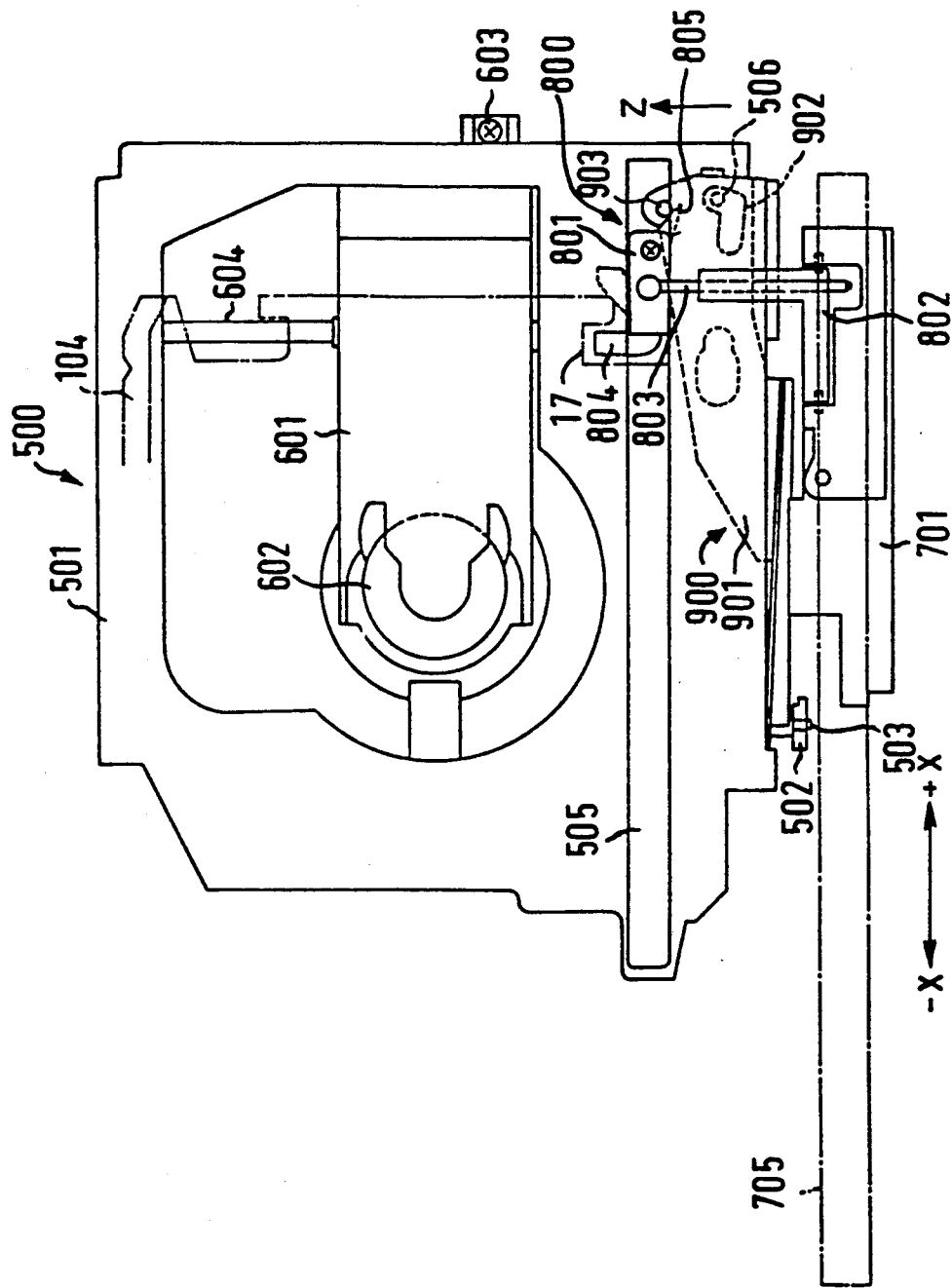

As shown in FIGS. 9 and 10, the tray carrier 800 is mounted to the first slider 701. The tray carrier 800 comprises a third slider 801, a cylinder 802 and a piston rod 803. The third slider 801 is movably coupled to the tray support member 501 of the vertical transferring section 500. The tray support member 501 is defined a slit 505 extending in the direction of the arrows +x and −X. The third slider 801 fits in the slit 505.

Figure 12:
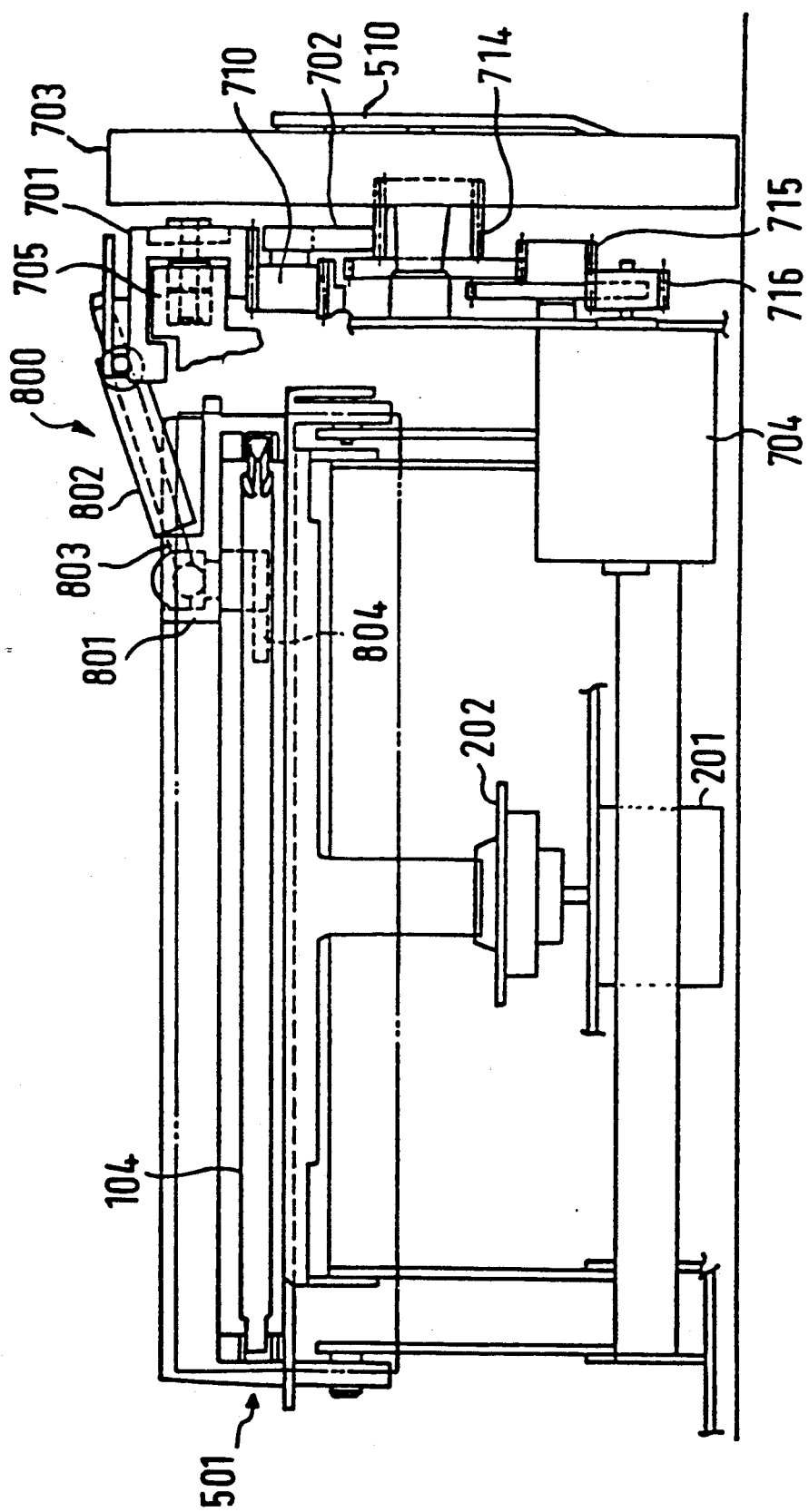
FIGS. 12 and 13 are front elevations explaining the operation of the tray carrier of FIGS. 9 and 10.
Figure 13:
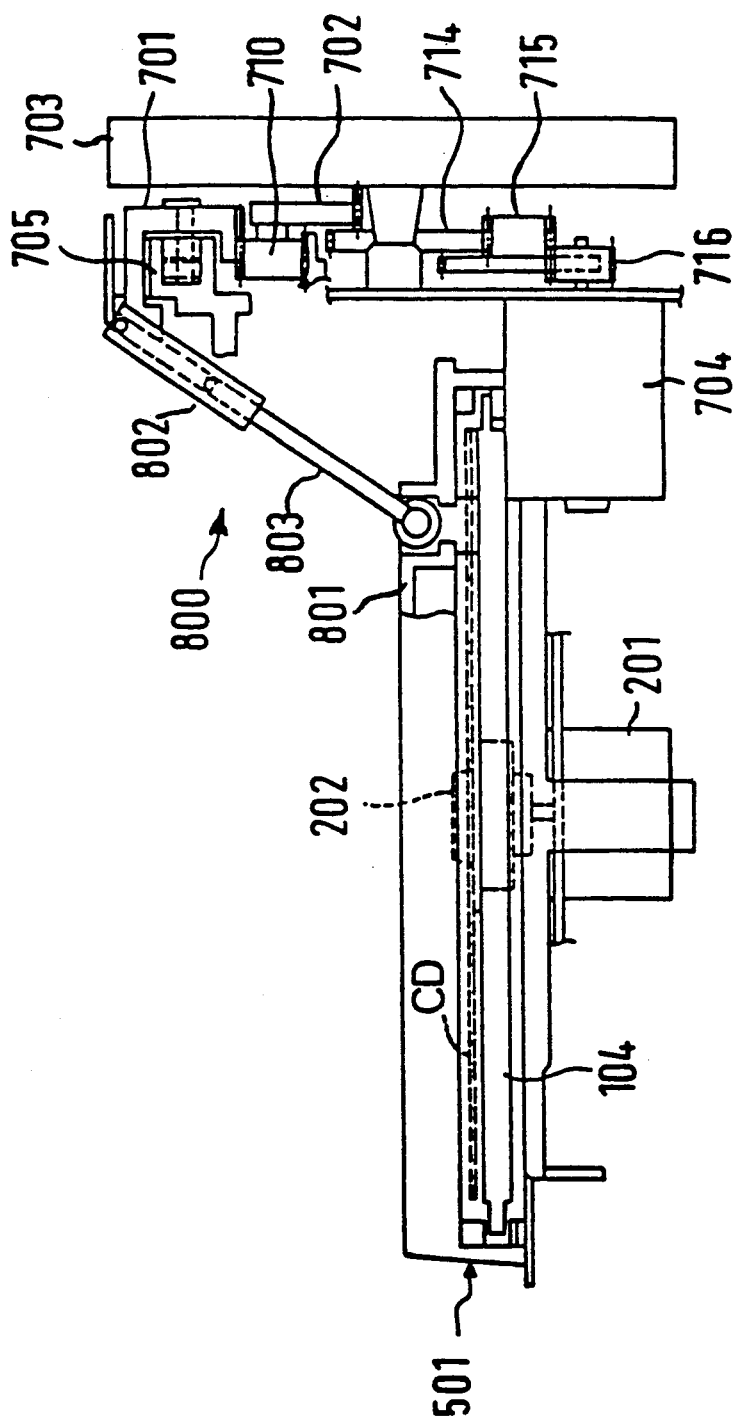

As shown in FIGS. 12 and 13, one end of the cylinder 802 is rotatably mounted to the first slider 701. The rotating axis of the cylinder 802 extends along the direction of arrows +x and −X (see FIGS. 9 and 10). The piston rod 803 is coupled between the cylinder 802 and the third slider 801. One end of the piston rod 803 movably fits in the cylinder 802. Thus, the piston rod 803 is pushed out from the cylinder 802 when the tray support member 501 moves downward.

Figure 11:
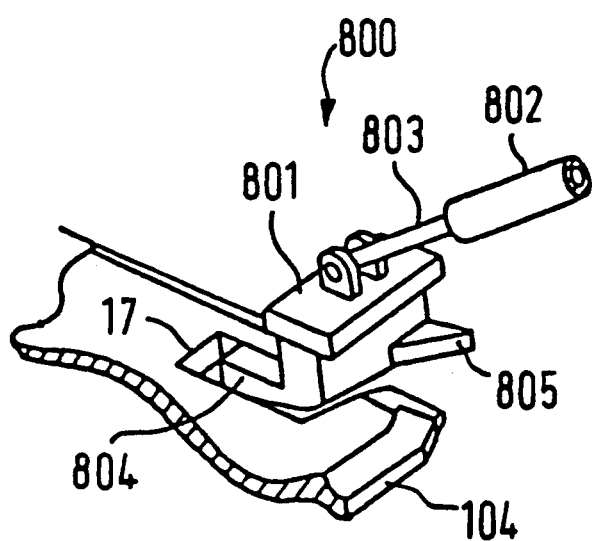
FIG. 11 is a perspective view explaining the operation of the tray carrier of FIGS. 9 and 10.

As shown in FIGS. 9, 10 and 11, the third slider 801 has a hook 804 at its one end. The hook 804 has a shape in flat section capable of passing through each of the L-shaped notches 17 of the trays 101 to 106 stored in the cartridge 100 and the extra tray 107 positioned below the cartridge 100. Thus, the hook 804 can move in the vertical direction without being interfered with the trays 101 to 107, for the search operation according to the search mechanism 300.

The third slider 801 of the tray carrier 800 is provided with a lock release part 805. The lock release part 805 runs against a lock release mechanism 900. The lock release mechanism 900 comprises a lock lease lever 901 which is movably mounted to the underside of the tray support member 501. The lock release lever 901 has an L-shape opening 902 and an engaging pin 903. The L-shape opening 902 loosely fits to a regulation pin 506 provided to the tray support member 501. The engaging pin 903 faces to the slit 505 of the tray support member 501 so that the lock release part 805 interferes with the engaging pin 903 when the third slider 801 moves in the direction of the arrow +x.

The regulation pin 506 of the tray support member 501 engages with one end of the L-shape opening 902. Thus, the regulation pin 506 regulates the movement of the lock release lever 901 in the direction of the arrow +X. When the third slider 801 moves in the direction of the arrow +x, as shown in FIG. 10, the lock release part 805 engages with the engaging pin 903. The lock release part 805 has a slant so that the lock release part 805 pushes the engaging pin 903 in the direction of the arrow Z in the drawing. The L-shape opening 902 is released from the regulation by the regulation pin 506. As a result, the lock release lever 901 is allowed to slightly move in the direction of the arrow +X.

Figure 14:
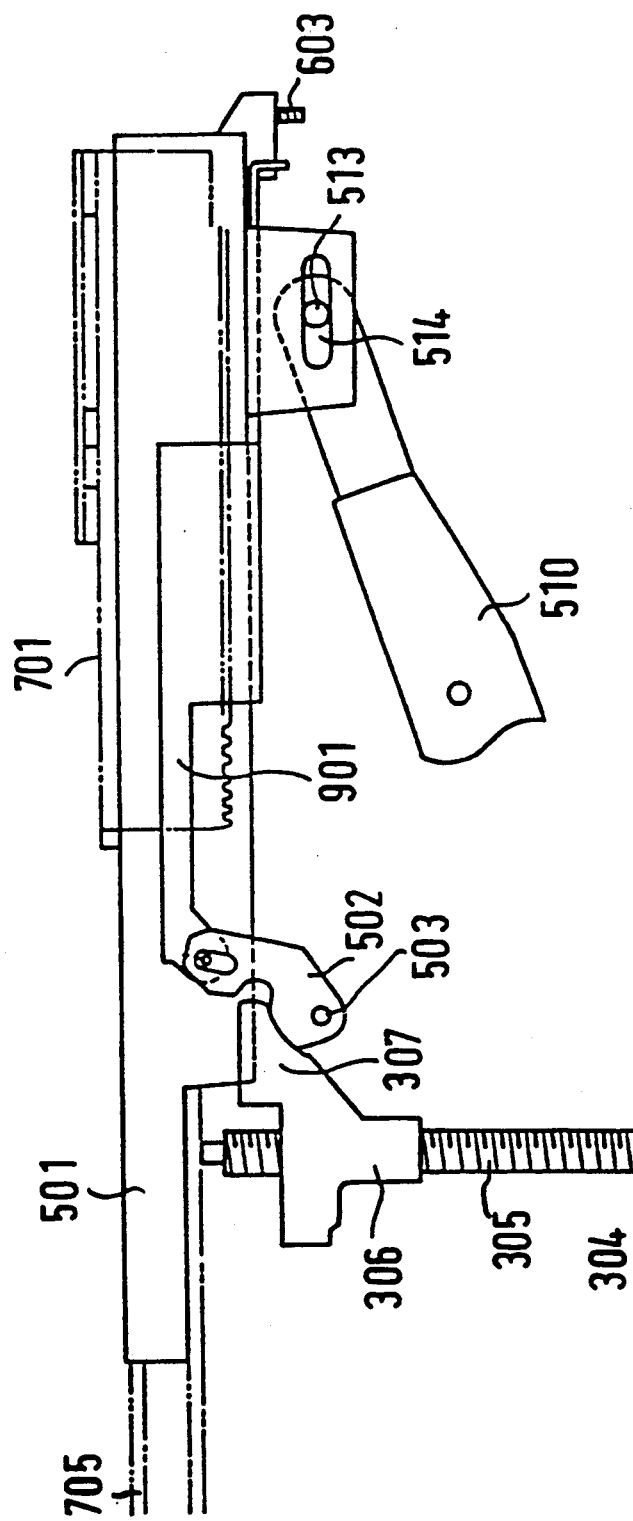
FIG. 14 is a side elevation explaining the lock release mechanism of FIGS. 9 and 10.

As shown in FIG. 14, the leftward end of the lock release lever 901 is coupled to the lock lever 502. Thus lock release lever 901 rotates the lock lever 502 in the direction of the arrow V (see FIG. 1) according to the slight movement in the direction of the arrow +X. Then, the transferring mechanism 400 is disengaged from the engaging arm 307 of the travelling arm 307, as described before.

The reason for providing the above-mentioned lock release mechanism 900 is as follows. When such an autochanger type CD player is transported or is given with a mechanical shock, the lock lever 502 is easily disengaged from the engaging arm 308. The tray support member 501 may be shifted from a given vertical position or may work inadvertently. The lock release mechanism 900 can prevent the defect. The portion of the L-shape opening 902 extending in the direction of the arrow Z runs against the regulation pin 506 to regulate the movement of the lock lease lever 901.

Figure 15:
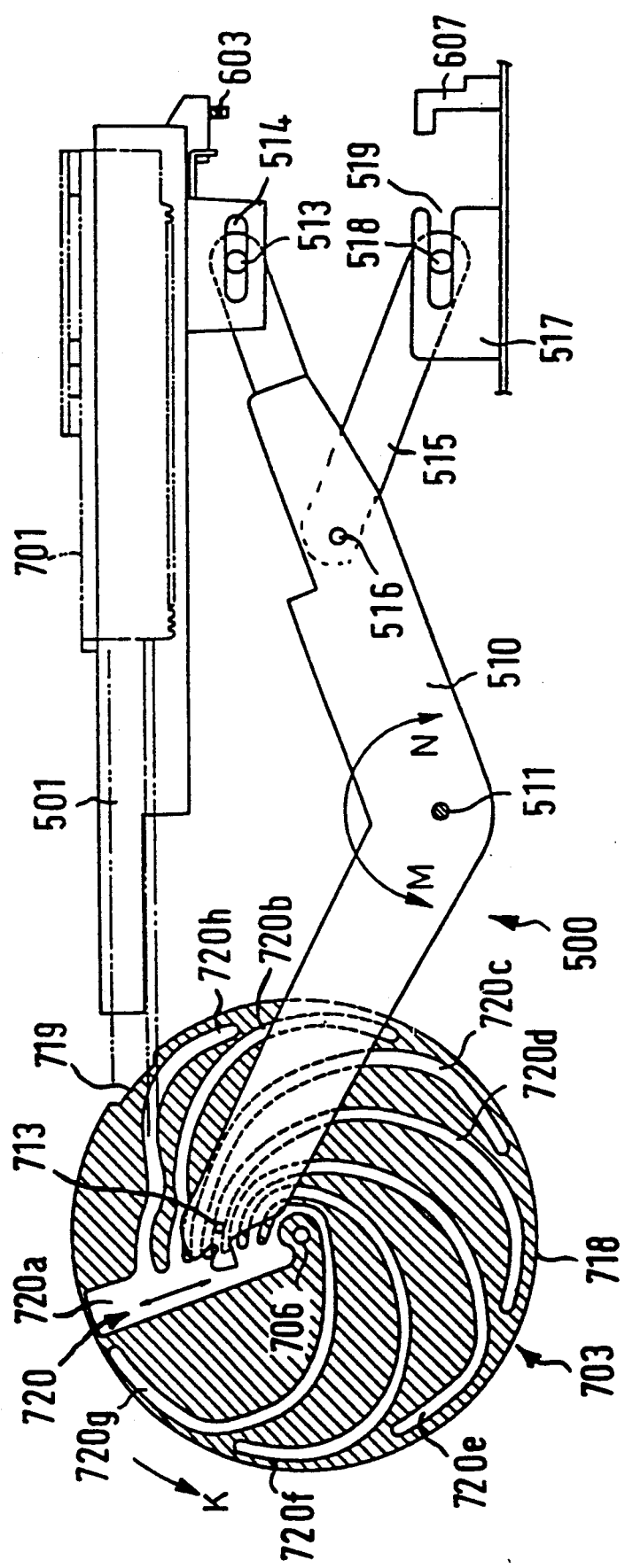
FIGS. 15 and 16 are side elevations explaining the operation of the vertical transferring section of the embodiment.
Figure 16:
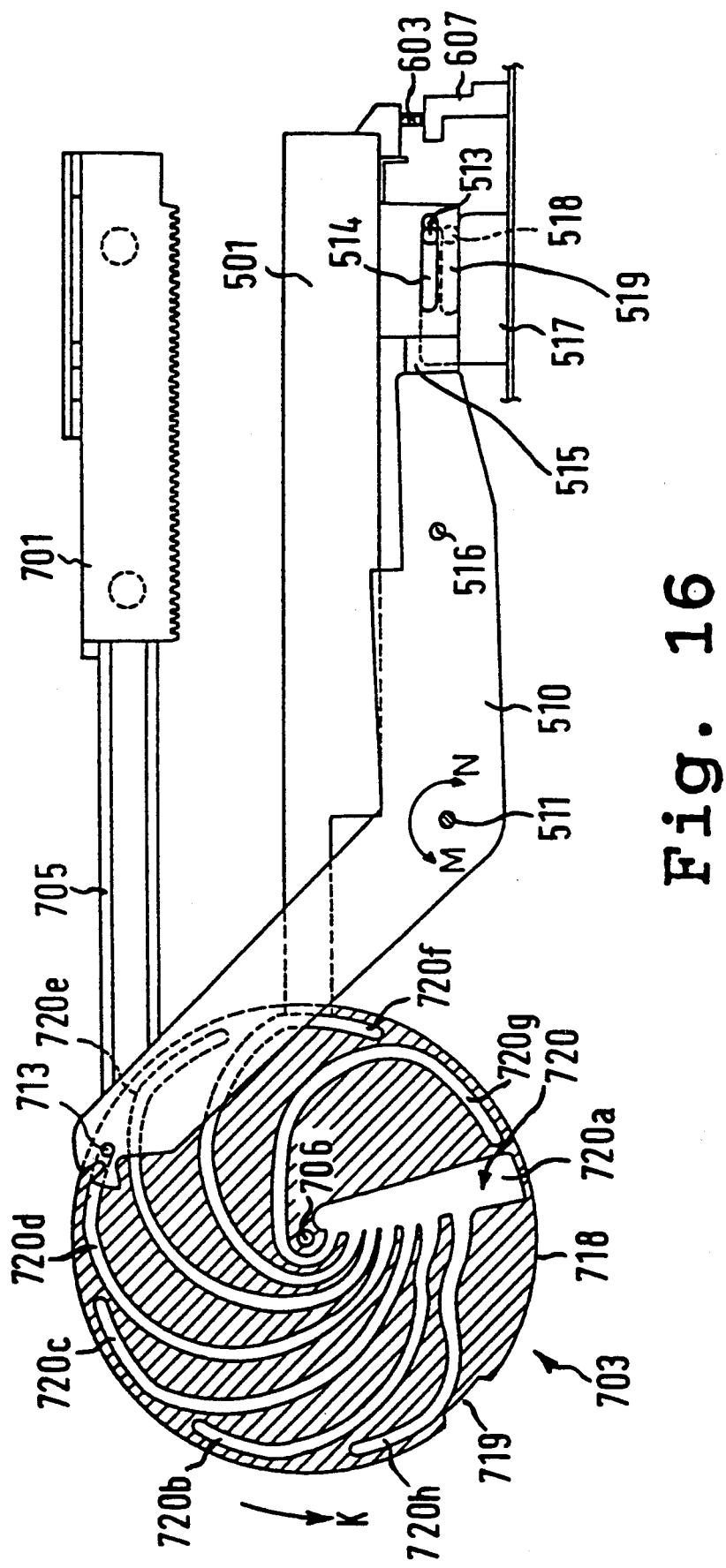
Figure 17:
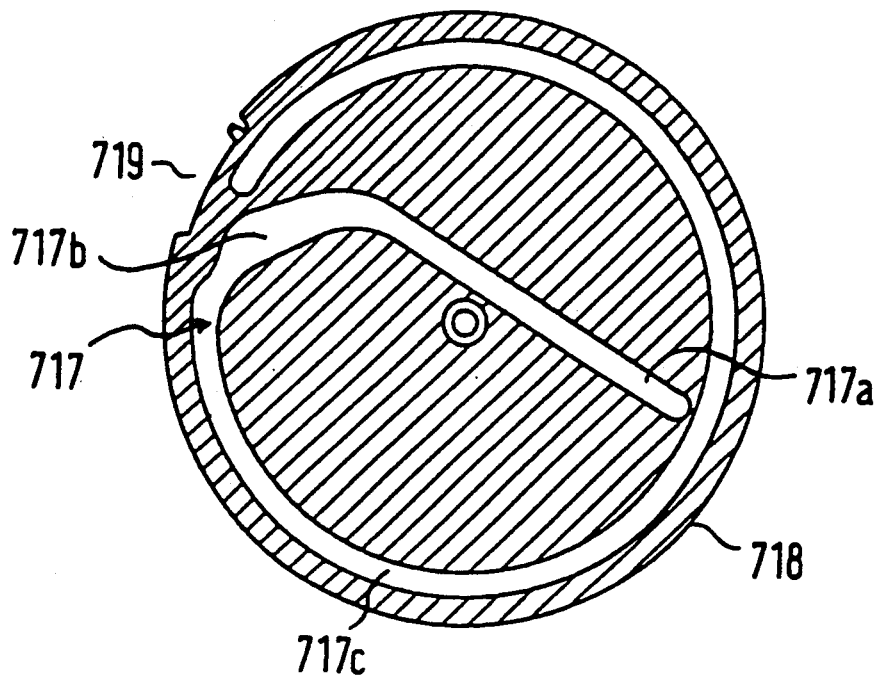
FIGS. 17 and 18 are flat views showing the vertical transfer trigger cam groove and the vertical transfer drive cam groove of the rotary cam of FIGS. 15 and 16.
Figure 18:
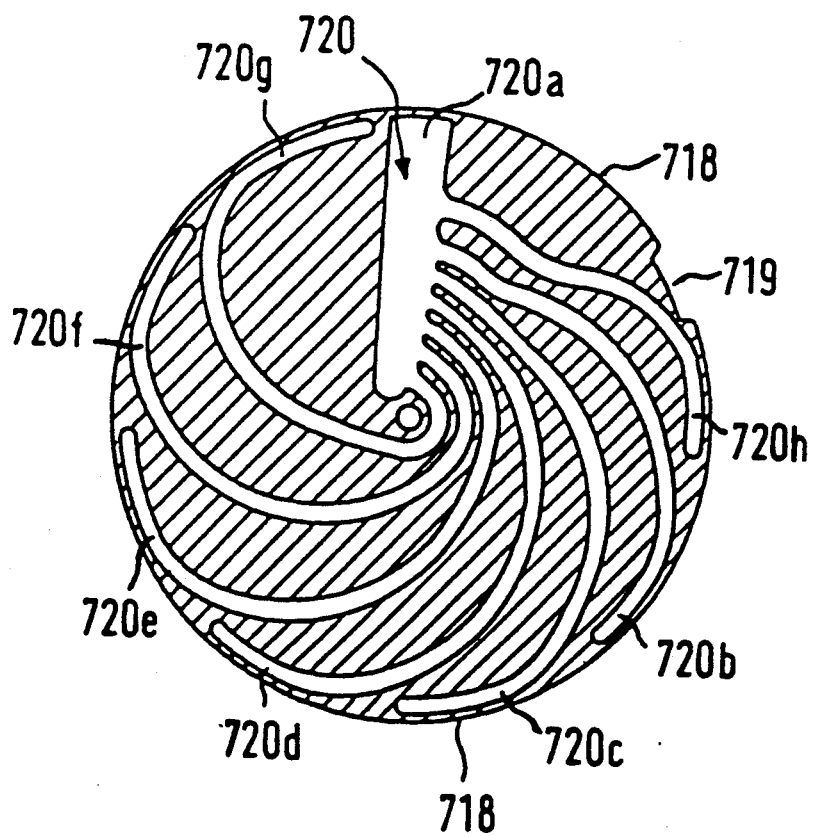

Referring now to FIGS. 15 to 18, the vertical transferring mechanism 500 will be described. The vertical transferring mechanism 500 is provided for driving the tray support member 501 in the vertical direction. The vertical transferring mechanism 500 comprises the rotary cam 703 and a vertical drive lever 510. The rotary cam 703 has cam grooves on both surfaces. One surface of the rotary cam 703 is provided the vertical transfer trigger cam groove 717, as described above. Other surface has a vertical transfer drive cam groove 720. FIGS. 17 and 18 show the vertical transfer trigger cam groove 717 and the vertical transfer drive cam groove 720 formed on the surfaces of the rotary cam 703.

As shown in FIG. 15, the vertical drive lever 510 is rotatably mounted to the chassis of the apparatus by a support pin 511. The vertical drive lever 510 is provided a cam pin 512 and an engaging pin 513 on their respective ends. The cam pin 512 fits to the vertical transfer drive cam groove 720 of the rotary cam 703. The engaging pin 513 fits to a slit 514 defined on the tray support member 501.

The rotary cam 703 is triggered to rotate in the unti-clockwise direction, when the search operation has been carried out. The triggered rotation of the rotary cam 703 is made by the engagement of the cam pin 713 of the second slider 702 with the second straight portion 717b of the vertical transfer trigger cam groove 717, as described before (see FIG. 6). The vertical transfer drive cam groove 720 further rotates in the unti-clockwise direction by the transfer drive motor 704. The rotation of the rotary cam 704 after the trigger operation is carried out by the transfer drive motor 704, as also described before.

The vertical transfer drive cam groove 720 is provided for driving the vertical drive lever 510. As shown in FIG. 18, the vertical transfer drive cam groove 720 comprises a common portion 720a and a group of first to seventh divided portions 720b to 720h. The common portion 720a extends along the radius of the rotary cam 703. Each one end of the divided portions 720b to 720h meets the common portion 720a. Then the divided portions 720b to 720h spirally extend toward the periphery of the rotary cam 703. The divided portions 720b to 720h of the vertical transfer drive cam groove 720 correspond to the vertical positions of the trays 101 to 106 stored in the cartridge 100 and the extra tray 107 positioned below the cartridge 100.

The position of the cam pin 512 is defined by the search mechanism 300. This is because the tray support member 501 is moved to a prescribed vertical position by the travelling nut 306 of the search mechanism 300, as described before. During the search operation, the vertical drive lever 510 is rotated by the tray support member 501. The cam pin 512 thus moves in the common portion 720a of the vertical transfer drive cam groove 720. When the tray 103 is selected, the cam pin 512 faces to the divided portion 720c. Then the cam pin 512 follows the divided portion 720c in the rotation of the rotary cam 703. At this time, the tray support member 501 is disengaged from the search mechanism 300, as described before. Thus, the rotary cam 703 driven by the transfer drive motor 704 rotates the vertical drive lever 510 in the clockwise direction in the drawing, i.e., in the direction of the arrow N. The vertical drive lever 510 thus lowers the tray support member 501 to the playback section 200 (see FIG. 5). At this time, the rotary cam 703, the vertical drive lever 510 and the tray support member 501 have the positions, as shown in FIG. 16.

When the playback operation is completed or finished, the transfer drive motor 704 is driven in the reverse direction by the microcomputor. Then reverse operations for the rotary cam 703, the vertical drive lever 510 and the tray support member 501 are carried out. The reverse rotation of the rotary cam 703 also carries out reverse operations of the horizontal transferring section 700. Thus, a prescribed tray 103, e.g., the tray 104 transferred to the playback section 200 for the playback operation of the CD is returned to the specified position in the cartridge 100 where the tray 104 was stored before.

As shown in FIG. 15, the vertical transferring section 500 further comprises a stabilizer link 515. One end of the stabilizer link 515 is rotatably coupled to the vertical drive lever 510 by a support pin 516. Other end of the stabilizer link 515 engages with a stabilizer 517 provided to the chassis. That is, an engaging pin 518 provided on the other end of the stabilizer link 515 engages with a slit 519 defined in the stabilizer 517. Thus, the stabilizer 517 and the stabilizer link 515 stabilize the rotations of the vertical drive lever 510 in both the directions of the arrows M and N.

On the rotary cam 703, as shown in FIG. 18, the respective one ends of the divided portions 720b to 720h of the vertical transfer drive cam groove 720 are led to the common portion 720a but their positions differ to each other along the radius of the rotary cam 703.

As described above, the present invention can provide an extremely preferable autochanger type disc player.

While there has been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example for the purposes of a dividual application.

What is claimed is:

1. An autochanger type disc player for automatically changing a plurality of discs, comprising:
   a plurality of trays for holding discs;
   a cartridge capable of containing the trays;
   a vertical tray transfer member movable to a position corresponding to a desired tray;
   a horizontal tray transferring mechanism that transfers the desired tray between the vertical tray transfer member and the cartridge;
   and a carrier mechanism that carries the vertical tray transfer member from the position corresponding to the desired tray to a disc playback position,
   wherein the carrier mechanism is equipped with a cam that has a plurality of cam grooves corresponding to respecrtive possible moving paths of the vertical tray transfer member from the positions corresponding to the trays contained in the cartridge to the disc playback position and
   wherein when the vertical tray transfer member is at the position corresponding to the desired tray in the cartridge, the cam groove of the rotating body corresponding to the respective moving path between the vertical tray transfer member position and the disc playback position is selected and the vertical tray transfer member is guided by this cam groove.

2. The autochanger type disc player for automatically changing a plurality of discs as claimed in claim 1, further comprising:
   a carrier member having one end connected to a connecting section supported by a vertical tray transfer member and another end connected to a driving source that generates a driving force to move the tray between the above-mentioned cartridge and the vertical tray transfer member,
   wherein the carrier member extends and contracts by interlocking gear movement of the vertical tray transfer member to positions corresponding to the trays housed in the cartridge and the disc playback position.

3. The autochanger type disc player for automatically changing a plurality of discs as claimed in claim 1, wherein the plurality for trays include a notch, and wherein the horizontal tray transferring mechanism includes a hook shaped to fit within said notch whereby the plurality of trays can be removed from the cartridge.

* * * * *

UNITED STATES PATENT AND TRADEMARK OFFICE
CERTIFICATE OF CORRECTION

PATENT NO.  : 5,103,437
DATED       : April 07, 1992
INVENTOR(S) : Hiroshi Kawakami It is certified that error appears in the above-identified patent and that said Letters Patent is hereby corrected as shown below:

On title page, item [57]

Abstract, line 10, after "desired tray" insert --to--.

Claim 1, column 12, line 11, change "respecrtive" to --respective--.

Claim 1, column 12, line 17, change "rotating body" to --cam--.

Claim 3, column 12, line 39, change "for" to --of--.

Signed and Sealed this

Fifth Day of July, 1994

Attest:

BRUCE LEHMAN

Attesting Officer

Commissioner of Patents and Trademarks